United States Patent [19]

Ordines et al.

[11] Patent Number: 4,601,733

[45] Date of Patent: Jul. 22, 1986

[54] HIGH VOLTAGE GENERATOR FOR AN ELECTROSTATIC DUST PRECIPITATOR

[75] Inventors: Jean-Pierre Ordines, Clamart; Dominique Bacot, 31, Quai Anatole France, 75007 Paris; Jean-Michel Detroyat, 14, rue de Condé , 75006 Paris, all of France

[73] Assignees: Dominique Bacot; Jean-Michel Detroyat, both of Paris, France

[21] Appl. No.: 654,944

[22] Filed: Sep. 27, 1984

[30] Foreign Application Priority Data

Sep. 29, 1983 [FR] France ................................ 83 15565

[51] Int. Cl.[4] .......................... B03C 3/02; H02M 3/35; H02M 1/00; H65K 7/02

[52] U.S. Cl. ........................................ 55/139; 363/23; 363/124; 363/144; 361/411

[58] Field of Search ............... 55/139; 323/DIG. 903; 363/21, 23, 26, 124, 141, 144; 361/394, 395, 399, 417

[56] References Cited

U.S. PATENT DOCUMENTS

| | | | |
|---|---|---|---|
| 3,490,806 | 2/1971 | Baysinger | 55/139 X |
| 3,581,462 | 6/1971 | Stump | 55/139 X |
| 3,648,437 | 3/1972 | Bridges | 55/139 X |
| 3,757,803 | 9/1973 | Chiang | 55/139 X |
| 3,877,896 | 4/1975 | Muskovac | 55/139 X |
| 3,898,468 | 8/1975 | Guerin | 55/139 X |
| 3,900,766 | 8/1975 | Kawada | 55/139 X |
| 3,984,215 | 10/1976 | Tucker | 55/139 X |
| 4,261,712 | 4/1981 | Kinkade | 55/139 X |
| 4,274,843 | 6/1981 | Sone et al. | 55/139 |
| 4,479,164 | 11/1984 | Siegel | 323/903 X |

FOREIGN PATENT DOCUMENTS

| | | |
|---|---|---|
| 34075 | 8/1981 | European Pat. Off. . |
| 1114785 | 9/1961 | Fed. Rep. of Germany . |
| 958008 | 5/1964 | United Kingdom . |
| 1477051 | 6/1977 | United Kingdom . |
| 2028606 | 3/1980 | United Kingdom . |
| 1566242 | 4/1980 | United Kingdom . |
| 2050087 | 12/1980 | United Kingdom . |
| 2122433 | 1/1984 | United Kingdom . |

*Primary Examiner*—S. Leon Bashore
*Assistant Examiner*—Thomas M. Lithgow
*Attorney, Agent, or Firm*—Brisebois & Kruger

[57] ABSTRACT

A high voltage generator 1 for an electrostatic dust precipitator 2 comprises a low voltage oscillator 6, operating from a low voltage continuous source, such as a car battery, which supplies a current chopper 7. The output from the chopper 7 is fed to the primary winding 9 of an induction coil 10. The secondary winding 11 of the coil 10 is connected to one of a metal surface 3 of the dust precipitator to apply a high potential difference between the metal surfaces 3,4 to precipitate dust. Preferably the metal surface 3 is connected to the secondary winding 11 via a high voltage diode.

12 Claims, 3 Drawing Figures

HIGH VOLTAGE GENERATOR FOR AN ELECTROSTATIC DUST PRECIPITATOR

INTRODUCTION

The invention relates to a high voltage generator for an electrostatic dust precipitator, or the like, for fluids, and in particular gaseous fluids, which dust precipitator comprises metal surfaces disposed opposite one another so as to provide passages for the fluid from which dust is to be removed, a high potential difference being established between these metal surfaces.

Dust precipitators of this type are known and are used in a number of fields for the removal of dust from gas or smoke, or combustion gases, in particular during the production of energy from thermal sources, in the iron and steel industry and in the chemical industry etc. However, the production of the high voltage for dust precipitators of this type has up to now required relatively complex and costly circuits and plant.

SUMMARY OF THE INVENTION

The particular aim of the invention is to provide a high voltage generator for an electrostatic dust precipitator which is structurally simple, economic and strong and which is of a reduced size, in particular for use in motor vehicles, for the removal of dust from air entering into the engine, or from the air used for air-conditioning in the passenger space, or for filtering the exhaust gases, which generator should enable the achievement of performances which are at least equivalent to those obtained up to now.

The present invention provides a high voltage generator for an electrostatic dust precipitator or the like for fluids, and in particular gaseous fluids, which dust precipitator comprises metal surfaces disposed opposite one another so as to provide a passage for the fluid from which dust is to be removed, a high potential difference being established between these metal surfaces, the generator comrising, in combination, a low voltage oscillator, a current chopper whose input is connected to the output of the oscillator, and an induction coil or the like comprising a primary winding connected to the output of the chopper and a secondary winding connected to the metal surfaces of the dust precipitator such that a high potential difference produced at the terminals of the secondary winding is supplied to the said metal surfaces.

A high voltage generator of this type enables the simple production of a high negative voltage resulting in improved efficiency by means, in particular, or improved ionization to the particles and fewer breakdowns.

The oscillator is advantageously of simple type, having relaxation oscillations, the frequency of the oscillations lying in particular between 150 Hz and 200 Hz. The rise time of the oscillations may be approximately 5 ms, whereas the fall time may be approximately 0.8 ms.

The high voltage generator preferably comprises means for clipping the high voltage and for maintaining it lower than or equal to a predetermined limit enabling the reliable prevention of any breakdown between the metal surfaces of the dust precipitator.

The connection between one terminal of the secondary winding of the induction coil and the metal surfaces of the dust precipitator is advantageously provided by a high voltage diode. The high voltage generator may be arranged in the form of a removable assembly comprising the induction coil to which there is attached a lower housing containing the eletronic circuits. A high voltage connection plug may be provided on the side opposite to the electronic housing, at the end of a substantially cylindrical extension, in which there is advantageously disposed a cap plug, of a removable type, which supports the high-voltage diode internally and the high-voltage connection plug connected to the said diode externally.

The invention also provides an electrostatic dust precipitator, or the like, for fluids, and in particular gaseous fluids, which dust precipitator comprises metal surfaces disposed opposite one another so as to provide a passage for the fluid from which dust is to be removed, a high electric potential difference being established between these metal surfaces, this dust precipitator being characterised in that it comprises a high voltage generator connected to the metal surfaces as set out above.

The dust precipitator may have a capacitance, between these metal surfaces, of approximately 2 to 10 nf, the leakage resistance of the dust precipitator advantageously being greater than 5MΩ, and in particular approximately 10MΩ.

BRIEF DESCRIPTION OF THE DRAWINGS

The invention will be further described by way of example only with reference to the accompanying drawings in which.

DESCRIPTION OF THE PREFERRED EMBODIMENT

Figure 1:
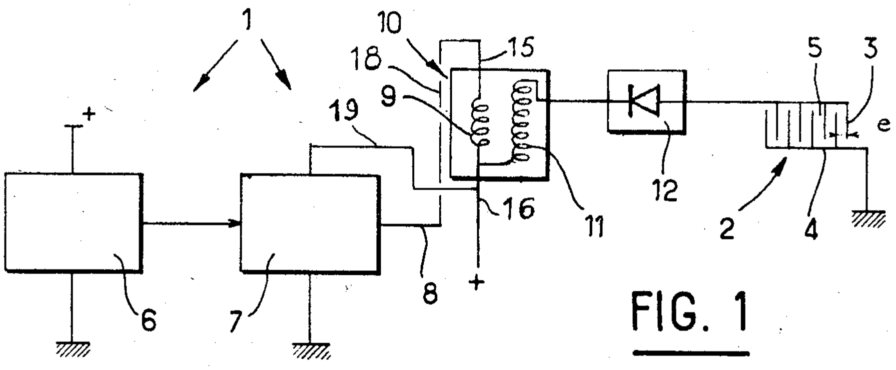
FIG. 1 is a block diagram of an embodiment of a high negative voltage generator for an electrostatic dust precipitator, in accordance with the invention.

FIG. 1 shows, very diagrammatically, a high voltage generator 1 for an electrostatic dust precipitator for fluids 2. This dust precipitator comprises metal surfaces 3, 4 disposed opposite one another to form passages 5 for the fluid from which dust is to be removed. The surfaces 3, 4 are brought to different voltages such that a high electrical potential difference is established between these surfaces. It is known that when the fluid is passing throught the passages 5, the solid or liquid particles carried by this fluid are electrified as a result of the potential difference and are attracted by the surface which is at the appropriate potential for attracting the particles as a function of their electrical charge.

The high voltage generator 1 compises a low voltage oscillator 6 operating from a continuous low voltage source, for example at 12 or 24 volts. This oscillator is connected between the positive terminal of the continuous voltage source (not shown) and the ground connected the negative terminal of the continuous voltage source. The oscillator 6 may be structurally simple and may supply the relaxation oscillations produced by charging and discharging a capacitor. The frequency of the oscillations supplied by the oscillator 6 is preferably between 150 Hz and 200 Hz. the rise time of the oscillations, corresponding to charging of the capacitor, may be approximately 5 ms, whereas the fall time of the oscillations may be approximately 0.8 ms which corresponds to the discharge of the capacitor.

The output of the oscillator 6 supplying the oscillations is connected to the input of a current chopper circuit 7. This chopper 7 is also supplied with a low voltage between the positive terminal of the continuous voltage source and ground. The connection of the chopper to the positive terminal is provided by a cable 19 connected to a terminal 16.

The output 8 of the current chopper is connected by a cable 18 to a terminal 15 of the primary winding 9 of an induction coil 10 or the like. The other terminal 16 of this primary winding 9 is connected to the positive terminal of the continuous voltage source. As a result of the chopper 7 the intensity of the current circulation in the primary winding 9 will be subject to variation, as a function of time, the variation of current with time being exemplified by a rectangular battlement shape.

The induction coil 10 may be of the type used in the ignition circuits of motor vehicles.

The coil 10 comprises a secondary winding 11 whose number of turns, which is much greater than that of the primary winding 9, is determined so as to enable the production, by induction, of the desired high voltage between the terminals of the coil 11 during the variation of intensity in the primary winding 9. One end terminal of the secondary winding 11 is connected to the terminal 16, whereas the other end terminal of this secondary winding 11 is connected, by means of a high voltage diode 12, to the metal surfaces 3. The cathode of the diode 12 is connected to the winding 11, whereas the anode is connected to the metal surfaces 3, which are thus brought to a high negative voltage with respect to the ground connected to the surfaces 4.

The metal surfaces 3 and 4 may be formed by parallel plane plates, by cylindrical surfaces of revolution having common axes, or the like. As shown in FIG. 1 the parallel plates can be intercalated.

The breakdown voltage between the surfaces 3 and 4 is essentially dependent on the distance e between these surfaces and dielectric constant of the fluid passing between these surfaces. Bearing these parameters in mind, the generator 1 is arranged such that the high voltage produced remains slightly lower than the breakdown voltage. Means are advantageously provided for clipping the high voltage and keeping it lower than or equal to a predetermined limit, this limit itself being slightly lower than the breakdown voltage. The means for clipping the high voltage may comprise diodes of the Zener type which introduce reference voltages from which the predetermined limit is established.

In a particularly advantageous embodiment of a high voltage generator of this type for an electrostatic dust precipitator for the gases produced by a gas generator, the dust precipitator 2 has a capacitance of approximately 2 to 10 nF which characterises, to some extent, the capacitive effect of the metal surfaces and therefore the combination of the distance e and the total surface area of the surfaces 3, 4. The leakage resistance of the dust precipitator is greater than 5MΩ, and advantageously is approximately 10MΩ. The high voltage supplied by the generator is limited to a value of approximately 10 kilovolts.

The operation of the dust precipitator equipped with the high voltage generator shown in FIG. 1 is as follows.

When the generator 1 is started, the plates 3 of the dust precipitator 2 receive high voltage pulses, generally at a frequency of more than 150 Hz, with respect to the surfaces 4 which are connected to ground. This leads to the establishment of a high potential difference in the passages 5 which cause the removal of dust from the gases passing through the passages. It has been observed experimentally that the results obtained with a dust precipitator of this type, in particular when used for removing dust from gases produced by a gas generator, are particularly satisfactory.

It has been observed experimentally that the high negative voltage enables improved efficiency as a result of improved ionization of the particles and produces less breakdowns.

Figure 2:
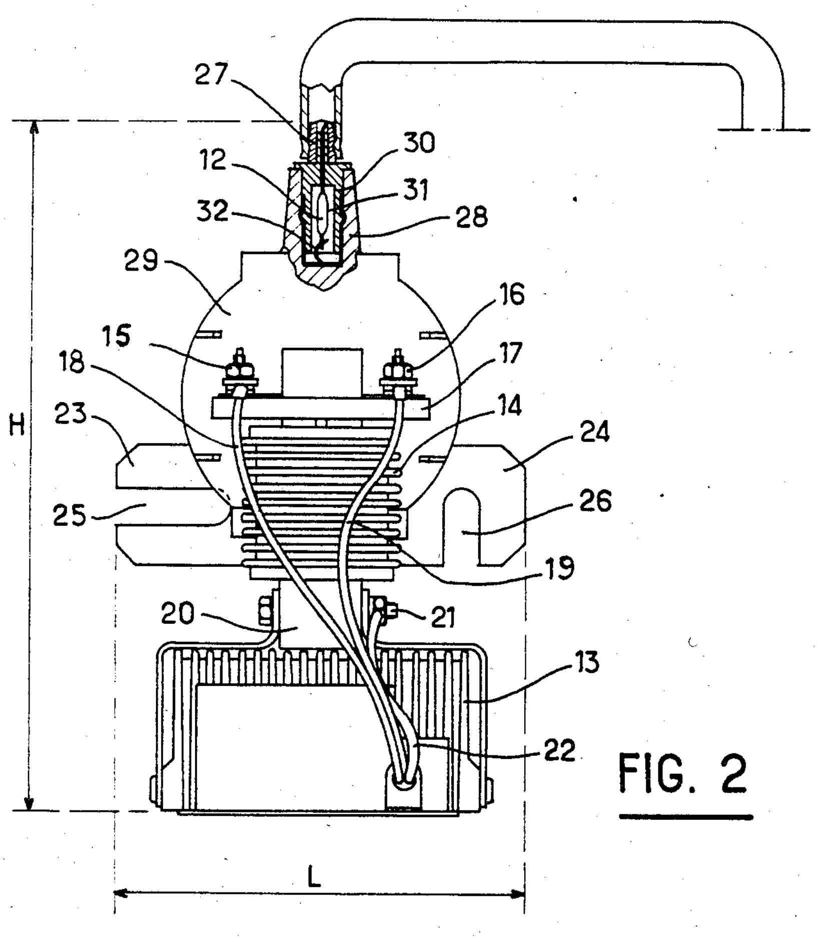
FIG. 2 is an elevation of the embodiment of the generator of FIG. 1.

FIG. 2 shows a practical embodiment of a generator of the invention for an electrostatic dust precipitator or filter. The generator 1 is constructed in the form of a removable assembly comprising a lower housing 13 containing the electronic circuits, this housing 13 being attached below a cast induction coil 14. The ends of the primary winding of the induction coil are connected to the external terminals 15, 16 located on a plate 17 on the side of the coil 14 opposite to the housing 13. The terminal 16 is designed to be connected to the positive terminal of the continuous voltage source formed by a battery (not shown). This terminal 16 is connected by a cable 19 to the chopper 7 (see FIG. 1) located in the housing 13. The other terminal 15 is connected by a cable 18 to the output 8 (see FIG. 1) not shown in FIG. 2, of the current chopper. A metal frame comprising an extension 20 between the housing 13 and the casing 14 may be provided for fastening these components. A terminal 21 for connection to the negative terminal of the battery is provided on this extension 20. This terminal 21 may be formed by a screw for fastening the housing 13 to the extension 20. A cable 22 provides the connection between the terminal 21 and the circuits located within the housing 13.

The frame of the apparatus advantageously has two fastening lugs 23, 24, provided with respective openings 25, 26, oriented at right angles to each other.

The generator comprises a high voltage connection plug 27 (designed for connection to the surfaces 3 of FIG. 1), provided on the side opposite to the electronic housing 13, at the end of a substantially cylindrical extension 28 provided at the upper end of a portion 29 substantially having the shape of a flat disc. The extension 28 is made from electrically insulating material and comprises an internal recess designed to receive a hollow plug 30, also of insulating material, which may be removed. In an internal cavity 31 of this plug there is disposed the high-voltage diode 12 whose cathode is electrically connected with a flexible contact 32 housed in the cavity of th extension 28 when the plug 30 is engaged in this cavity. The anode of the diode 12 is electrically connected to the connection plug 27, which is of metal, mounted on the plug 30.

The generator for the dust precipitator shown in FIG. 2 is particularly compact since its maximum dimension H may be less than 200 mm. Its thickness, i.e. its dimension in a direction perpendicular to the plane of FIG. 2 is lower than 100 mm, whereas its width L is approximately 100 mm. The high voltage produced may reach 10 kilovolts.

DESCRIPTION OF AN ALTERNATIVE EMBODIMENT

Figure 3:
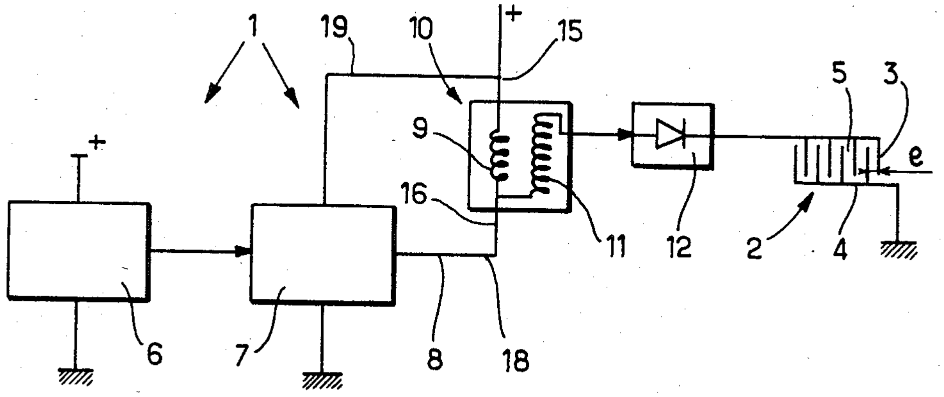
FIG. 3. is a block diagram similar to FIG. 1 of a generator for the production of a high positive voltage.

FIG. 3 is a block diagram of the high voltage generator connected so as to produce a high positive voltage on the surfaces 3 with respect to ground. The connection of the diode is reversed, the cathode of this diode being connected to the surfaces 3, whereas the anode is connected to one end of the winding 11. The output 8 of the chopper 7 is connected, via the cable 18, to the terminal 16 of the winding 9. The cable 19 provides the connection to the other terminal 15 connected to the positive terminal of the battery.

In order to move from a high negative voltage to high positive voltage, it is simply necessary, with respect to the apparatus shown in FIG. 2, to reverse the mounting of the diode 12 and to reversed the connections of the cables 18, 19 to the terminals 15, 16.

The high voltage generator for a dust precipitator in accordance with the invention is structurally simple, economic, strong, small in size and enables good dust removal performance to be achieved. Changing from a high negative voltage to a high positive voltage is carried out simply and rapidly.

A generator of this type is particularly suitable for dust precipitators provided in mobile devices, in particular vehicles, for removing the dust from combustion gases, in particular the gases from gas generators.

We claim:

1. A high voltage generator for an electrostatic dust precipitator having metal surfaces in opposed insulated relation to each other to provide a passage for fluid from which dust is to be removed, said high voltage generator comprising, a low voltage oscillator having an output, a current chopper having an input connected to the output of the low voltage oscillator, said current chopper having an output, an induction coil comprising a primary winding connected to the output of the chopper, and a secondary winding connected to at least one of the metal surfaces of the dust precipitator by a high voltage diode, so that a high potential difference from the secondary winding is produced across the opposed metal surfaces of the dust precipitator, and wherein, said high voltage generator further comprises a removeable assembly having a lower housing containing said low voltage oscillator and current chopper, said assembly further comprising a portion with the induction coil attached thereto connected above said lower housing, and a high voltage connection in the form of a substantially cylindrical extension on the side of the assembly portion opposite said lower housing, said extension containing a removable hollow plug which supports the diode therein, and a high voltage connection plug connected to said diode at a location externally of the removeable hollow plug.

2. A high voltage generator according to claim 1, wherein said oscillator comprises, a relaxation oscillator with an oscillation frequency between 150 and 200 Hz.

3. A high voltage generator according to claim 2, wherein said oscillator comprises, means for producing oscillations with a rise time of about 5 ms and a fall time of about 0.8 ms.

4. A high voltage generator according to claim 1, wherein said diode comprises clipping means for clipping the high potential difference produced across the opposed metal surfaces to maintain the potential at a predetermined lever lower than the breakdown voltage between said metal surfaces.

5. A high voltage generator according to claim 4, wherein said generator produces a high potential difference of about 10 kilovolts across said metal surfaces.

6. A high voltage generator according to claim 1, wherein said diode has a cathode connected to said secondary winding, and has an anode connected to one of said metal surfaces, to maintain said surface at a high negative potential.

7. A high voltage generator according to claim 1 wherein said assembly portion further comprises a mounting frame with a first fastening lug having an elongated opening therein, and a second fastening lug having an elongated opening therein, said openings extending at a right angle to each other.

8. An electrostatic dust precipitator comprising, conductive surfaces in opposed insulated relation to each other to provide a passage for fluids from which dust is to be removed, and a high voltage generator for establishing a high potential difference between said surfaces said high voltage generator comprising, a low voltage oscillator having an output, a current chopper having an input connected to the output of a low voltage oscillator, said current chopper having an output, an induction coil comprising a primary winding connected to the output of the chopper, and a secondary winding connected to at least one of the conductive surfaces of the dust precipitator by a high voltage diode, so that a high potential difference from the secondary winding is produced across the opposed conductive surfaces of the dust precipitator, said high voltage generator further comprising a removeable assembly having a lower housing containing said low voltage oscillator and current chopper, said assembly also having a portion with the induction coil attached thereto connected above said lower housing, a high voltage connection in the form of a substantially cylindrical extension on the side of the assembly portion opposite said lower housing, said extension containing a removable hollow plug which supports the diode therein, and a high voltage connection plug connected to said diode at a location externally of the removeable hollow plug.

9. A dust precipitator according to claim 8, wherein the capacitance between the conductive surfaces is in the range of 2 to 10 nF.

10. A dust precipitator according to claim 8, wherein said conductive surfaces are each conductive surfaces of a set of plates, and the sets of plates are intercalated.

11. A dust precipitator according to claim 10, wherein said conductive surfaces are each conductive surfaces of a set of metal plates.

12. A dust precipitator according to claim 8, wherein said conductive surfaces are metal surfaces.

* * * * *